US011237761B2

(12) United States Patent
Kou et al.

(10) Patent No.: US 11,237,761 B2
(45) Date of Patent: Feb. 1, 2022

(54) MANAGEMENT OF MULTIPLE PHYSICAL FUNCTION NONVOLATILE MEMORY DEVICES

(71) Applicant: MICROSOFT TECHNOLOGY LICENSING, LLC, Redmond, WA (US)

(72) Inventors: Lei Kou, Redmond, WA (US); Scott Chao-Chueh Lee, Bellevue, WA (US); Ho-Yuen Chau, Redmond, WA (US); Liang Yang, Redmond, WA (US); Chin Hwan Park, Redmond, WA (US); Yimin Deng, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 14 days.

(21) Appl. No.: 16/797,713

(22) Filed: Feb. 21, 2020

(65) Prior Publication Data

US 2021/0132860 A1     May 6, 2021

Related U.S. Application Data

(60) Provisional application No. 62/929,739, filed on Nov. 1, 2019.

(51) Int. Cl.
*G06F 3/06* (2006.01)
*G06F 9/50* (2006.01)

(52) U.S. Cl.
CPC .......... *G06F 3/0659* (2013.01); *G06F 3/0604* (2013.01); *G06F 3/0679* (2013.01); *G06F 9/5016* (2013.01)

(58) Field of Classification Search
CPC ..... G06F 3/0659; G06F 3/0604; G06F 3/0679
See application file for complete search history.

(56) References Cited

U.S. PATENT DOCUMENTS

| 2013/0159572 A1* | 6/2013 | Graham ................ G06F 13/387 |
| | | 710/104 |
| 2016/0203022 A1 | 7/2016 | Challa et al. |
| 2019/0266117 A1* | 8/2019 | Duncan ............... G06F 13/4004 |

FOREIGN PATENT DOCUMENTS

EP     3343881 A1     7/2018

OTHER PUBLICATIONS

"Single Root I/O Virtualization and Sharing Specification Revision 1.0", Retrieved from: http://www.pcisig.com/specifications/iov/single_root/, Sep. 11, 2007, 84 Pages.

(Continued)

*Primary Examiner* — Edward J Dudek, Jr.
(74) *Attorney, Agent, or Firm* — Newport IP, LLC; Leonard J. Hope

(57) ABSTRACT

The disclosed technologies include functionality for managing Multiple Physical Function NVMe Devices ("MFNDs") and the physical functions ("PFs") provided by MFNDs. For example, host devices can discover MFNDs, query the capabilities of MFNDs, and change the operating mode of an MFND between a user mode and a super administrator mode. Hosts can also utilize the disclosed technologies to create and delete individual child PFs on MFNDs. The disclosed technologies also include functionality for managing the settings associated with individual PFs of MFNDs. For example, hosts can query and modify the settings associated with individual child PFs of an MFND. The disclosed technologies also include functionality for managing the QoS provided by individual PFs of a MFND. For example, hosts can also query and modify the QoS provided by individual child PFs of an MFND.

20 Claims, 5 Drawing Sheets

(56) References Cited

OTHER PUBLICATIONS

"International Search Report and Written Opinion Issued in PCT Application No. PCT/US2020/056549", dated Feb. 5, 2021, 13 Pages.

* cited by examiner

MANAGEMENT OF MULTIPLE PHYSICAL FUNCTION NONVOLATILE MEMORY DEVICES

CROSS-REFERENCE TO RELATED APPLICATIONS

This application claims the benefit of provisional U.S. Patent Application No. 62/929,739, entitled "MANAGEMENT OF MULTIPLE PHYSICAL FUNCTION NONVOLATILE MEMORY DEVICES," which was filed on Nov. 1, 2019, and which is expressly incorporated herein by reference in its entirety.

BACKGROUND

Non-Volatile Memory Express ("NVMe") is an open host controller interface and storage protocol specification for accessing non-volatile storage devices attached via a Peripheral Component Interconnect Express ("PCIe") bus. Certain devices can expose multiple PCIe physical functions ("PFs"), such as independent NVMe controllers. These types of devices might be referred to herein as multiple physical function NVMe devices ("MFNDs").

In a MFND, one PF, which might be referred to herein as a "parent PF," can act as a parent controller to receive and execute administrative commands. Other physical functions on a MFND, which might be referred to herein as "child PFs" or "children PFs," can act as child controllers that behave similarly to standard NVMe controllers. Through this mechanism, a MFND can enable the efficient sharing of input/output ("I/O") resources between virtual machines ("VMs") or bare metal instances. For example, child PFs can be directly assigned to and utilized by different VMs through various direct hardware access technologies, such as HYPER-V NVMe Direct or Discrete Device Assignment ("DDA").

Through the mechanism described above, the child PFs exposed by a single MFND can appear as multiple, separate physical devices to individual VMs. This allows individual VMs to directly utilize a portion of the available storage space provided by a MFND with reduced central processing unit ("CPU") and hypervisor overhead.

Existing MFNDs, however, have limitations that restrict aspects of their functionality when used with VMs in the manner described above. As one specific example, quality of service ("QoS") levels are typically fixed for the lifetime of current MFNDs. As another example, current MFNDs cannot provide detailed information regarding the state of the child PFs to a host computing device. Current MFNDs can also suffer from other technical limitations, some of which are described in detail below.

It is with respect to these and other technical challenges that the disclosure made herein is presented.

SUMMARY

Technologies are disclosed herein for managing multiple physical function NVMe devices ("MFNDs"). Through implementations of the disclosed technologies, MFNDs can expose functionality for managing physical functions, managing the settings associated with individual physical functions, and managing the QoS provided by individual physical functions. Through the use of this functionality, the PFs provided by MFNDs can be efficiently configured to operate in a manner most suitable for a particular host and VM configuration and can operate more performantly than previous MFND implementations. Other technical benefits not specifically mentioned herein can also be realized through implementations of the disclosed subject matter.

Managing Child Physical Functions of a MFND

As discussed briefly above and in further detail below, the disclosed technologies include functionality for managing MFNDs and the physical functions provided by MFNDs. For example, and without limitation, implementations of the disclosed technologies can enable host computing devices to discover MFNDs, query the capabilities of MFNDs, and to change the operating mode of an MFND between a user mode and a super administrator mode. Host computing devices can also utilize the disclosed technologies to create and delete individual child physical functions on MFNDs.

Managing Settings Associated with Child Physical Functions of a MFND

The disclosed technologies also include functionality for managing the settings associated with individual physical functions of MFNDs. For example, and without limitation, implementations of the disclosed technologies can enable host computing devices to query and modify the settings associated with individual child physical functions of an MFND.

Managing QoS Provided by Child Physical Functions of a MFND

The disclosed technologies also include functionality for managing the QoS provided by individual physical functions of a MFND. For example, and without limitation, implementations of the disclosed technologies can also enable host computing devices to query and modify the QoS provided by individual child physical functions of an MFND.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
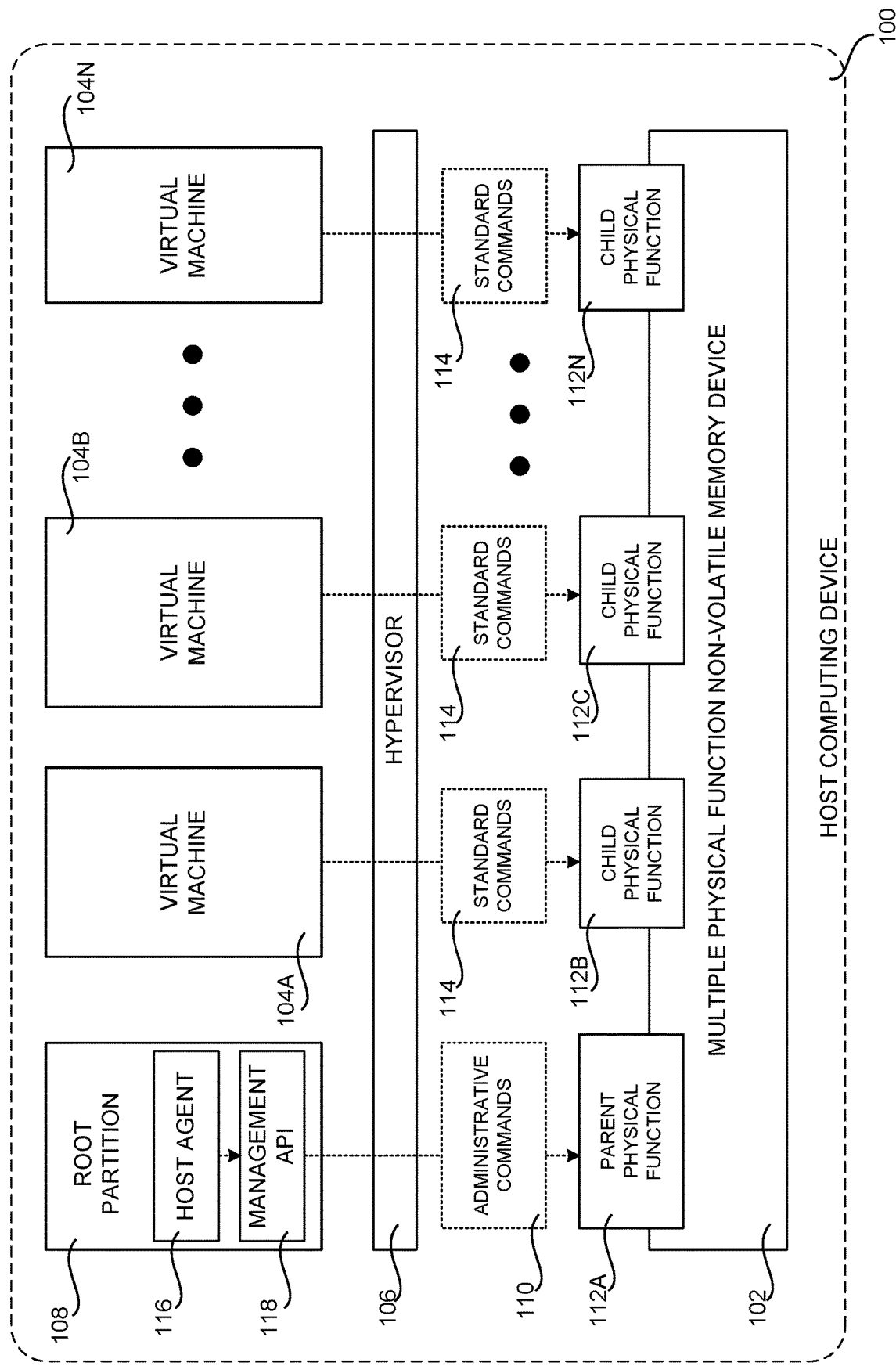
FIG. 1 is a computing architecture diagram that shows aspects of the configuration and operation of an MFND configured with the functionality disclosed herein for managing physical functions, according to one embodiment.

The following detailed description is directed to technologies for managing multiple physical function non-volatile memory devices. As discussed briefly above, MFNDs implementing the disclosed technologies can expose functionality for managing physical functions, managing the settings associated with individual physical functions, and managing the QoS provided by individual physical functions. Through the use of this functionality, the PFs provided by MFNDs can be efficiently configured to operate in a manner most suitable for a particular host and VM configuration and can operate more performantly than previous MFND implementations. Other technical benefits not specifically mentioned herein can also be realized through implementations of the disclosed subject matter.

While the subject matter described herein is presented in the general context of NVMe multiple physical function devices, those skilled in the art will recognize that the technologies disclosed herein can be used with other types of multiple physical function devices, including other types of multiple physical function non-volatile memory devices. Those skilled in the art will also appreciate that the subject matter described herein can be practiced with various computer system configurations, including host computers in a distributed computing environment, hand-held devices, multiprocessor systems, microprocessor-based or programmable consumer electronics, computing or processing systems embedded in devices (such as wearable computing devices, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for managing multiple physical function non-volatile memory devices will be described.

FIG. 1 is a computing architecture diagram that shows aspects of the configuration and operation of a MFND 102 configured with the management functionality disclosed herein, according to one embodiment. As discussed briefly above, the MFND 102 is an NVMe Specification compliant device in some embodiments. The MFND 102 can be hosted by a host computing device 100 (which might be referred to herein simply as a "host"), such as a server computer operating in a distributed computing network such as that described below with reference to FIG. 5.

As also discussed briefly above, NVMe is an open logical device interface specification for accessing non-volatile storage media attached via a PCIe bus. The NVMe Specification defines a register interface, command set, and collection of features for PCIe-based solid-state storage devices ("SSDs") with the goals of high performance and interoperability across a broad range of non-volatile memory subsystems. The NVMe Specification does not stipulate the ultimate usage model, such as solid-state storage, main memory, cache memory or backup memory.

NVMe provides an alternative to the Small Computer System Interface ("SCSI") standard and the Advanced Technology Attachment ("ATA") standard for connecting and transmitting data between a host computing device 100 and a peripheral target storage device. The ATA command set in use with Serial ATA ("SATA") SSDs and the SCSI command set for Serial Attached SCSI ("SAS") SSDs were developed at a time when hard disk drives ("HDDs") and tape were the primary storage media. NVMe was designed for use with faster media.

The main benefits of NVMe-based PCIe SSDs over SAS-based and SATA-based SSDs are reduced latency in the host software stack, higher input/output operations per second ("IOPS") and potentially lower power consumption, depending on the form factor and the number of PCIe lanes in use.

NVMe can support SSDs that use different types of non-volatile memory, including NAND flash and the 3D XPOINT technology developed by INTEL and MICRON TECHNOLOGY. Supported form factors include add-in PCIe cards, M.2 SSDs and U.2 2.5-inch SSDs. NVMe reference drivers are available for a variety of operating systems, including the WINDOWS and LINUX operating systems. Accordingly, it is to be appreciated that the MFND 102 described herein is not limited to a particular type of non-volatile memory, form factor, or operating system.

As described briefly above, the MFND 102 described herein includes capabilities for exposing multiple PFs 112A-112N to the host computing device 100. Each of the PFs 112A-112N is an independent NVMe controller in one embodiment. The PFs 112A-112N are other types of controllers in other embodiments. At least a plurality of PF 112A-112N are independent NVMe controllers and at least one distinct PF 112A-112N is a non-NVME controller in other embodiments. One PF 112A in the MFND 102, which might be referred to herein as the "parent PF 112A" or the "parent controller 112A," acts as a parent controller. In one embodiment, for instance, the parent PF 112A is the privileged PCIe function zero of the MFND 102. In this regard, it is to be appreciated that the parent controller might be configured as another PCIe function number in other embodiments. The parent PF 112A and child PFs might also be device types other than NVMe devices in some embodiments.

The parent PF 112A can act as a parent controller to receive and execute administrative commands 110 generated by a root partition 108. In particular, and as described in greater detail below, the parent PF 112A can manage child PFs 112B-112N such as, for example, by creating, deleting, modifying, and querying the child PFs 112B-112N.

The other physical functions 112B-112N provided by the MFND 102, at least some of which might be referred to herein interchangeably as "child PFs 112B-112N" or "child controllers 112B-112N," or might be referred to herein as "other PFs 112B-112N" when not a child controller of the parent controller. The child controllers are regular PCIe physical functions of the MFND device 102. By default, the disclosure will describe an implementation where the child controllers each behave like regular and independent NVMe controllers. The child controllers 112B-112N can support the administrative and I/O commands defined by the NVMe Specification.

Through the use of the multiple PFs 112A-112N exposed by the MFND 102, I/O resources provided by the MFND 102 can be efficiently shared between VMs 104A-104N. For instance, child PFs 112B-112N can be directly assigned to different VMs 104A-104N, respectively, through various direct hardware access technologies such as HYPER-V NVMe Direct or DDA. In this way, the child PFs 112B-112N exposed by a single MFND 102 can appear as multiple, separate physical devices to individual VMs 104A-104N, respectively. This allows individual VMs 104A-104N to directly utilize a respective portion of the available storage space provided by the MFND 102 with reduced CPU and hypervisor 106 overhead.

As discussed briefly above, existing MFNDs have limitations that restrict aspects of their functionality when used with VMs 104 in the manner described above. As one specific example, QoS levels are typically fixed for the lifetime of current MFNDs. As another example, current MFNDs cannot provide detailed information regarding the state of the child PFs 112 to a host 100 when the child PFs 112 are directly assigned to a VM. Current MFNDs can also suffer from other technical limitations.

The technologies presented herein address these and potentially other technical considerations by enabling a parent controller 112A of a MFND 102 to dynamically create and delete child PFs 112B-112N. A parent controller 112A can also define the commands that a given child PFs 112B-112N can support. Additionally, a parent controller 112A can set the QoS for each child controller 112B-112N, which can prevent VMs 104 with heavy workloads from impacting the performance of the device 102 for other VMs 104. Using the disclosed technologies, a parent controller 112A can also have visibility into the operational state of each child controller 112B-112N, even when the child controller is directly assigned to a VM. Additional details regarding these aspects will be provided below.

In some configurations, the host computing device 100 operates in a distributed computing network, such as that described below with regard to FIG. 5. Additionally, the host computing device 100 executes a host agent 116 and a management application programming interface ("API") 118 in order to enable access to aspects of the functionality disclosed herein.

The host agent 116 can receive commands from other components, such as other components in a distributed computing network such as that described below with regard to FIG. 5, and make calls to the management API 118 to implement the commands. In particular, the management API 118 can issue administrative commands to the parent PF 112A to perform the various functions described herein. Details regarding various methods exposed by the management API 118 to the host agent 116 for implementing the functionality disclosed herein are described below.

In some embodiments, the MFND 102 has two modes of operation: regular user mode and super administrator mode. In regular user mode, only read-only functions can be executed such as, for example, methods for getting the capability of the device 102 (which might be referred to herein as the "GetDeviceCapability" method) and for getting a list of the physical functions 112 on the device 102 (which might be referred to herein as the "GetPhysicalFunctionList" method), which are described in detail below.

The non-read-only management functions described herein (e.g. create/delete physical functions, set the QoS for a physical function, etc.) must be executed in the super administrator mode. If an attempt is made to execute these functions in regular user mode, an error (which might be referred to herein as an "ERROR_ACCESS_DENIED" error) will be returned. The API 118 exposes methods for getting the device operation mode (which might be referred to herein as the "GetDeviceOperationMode" method) and switching the device operation mode (which might be referred to herein as the "SwitchDeviceOperationMode" method) in some embodiments.

Managing Child Physical Functions of a MFND

As discussed briefly above and in further detail below, the disclosed technologies include functionality for managing MFNDs 102 and the child PFs 112B-112N provided by MFNDs 102. For example, and without limitation, implementations of the disclosed technologies can enable host computing devices 100 to discover MFNDs 102, query the capabilities of MFNDs 102, change the operating mode of an MFND 102 between a user mode and a super administrator mode, and perform other functions.

Host computing devices 100 can also utilize the disclosed technologies to create and delete individual child physical functions 112B-112N on MFNDs 102. Once the child physical functions have been created, a host computing device 100 can retrieve data describing the state of a child physical function 112 through a parent physical function. Additionally, a parent physical function can receive notification of events from the child physical function and execute operations against a child physical function. Details regarding these aspects are provided below.

Figure 2:
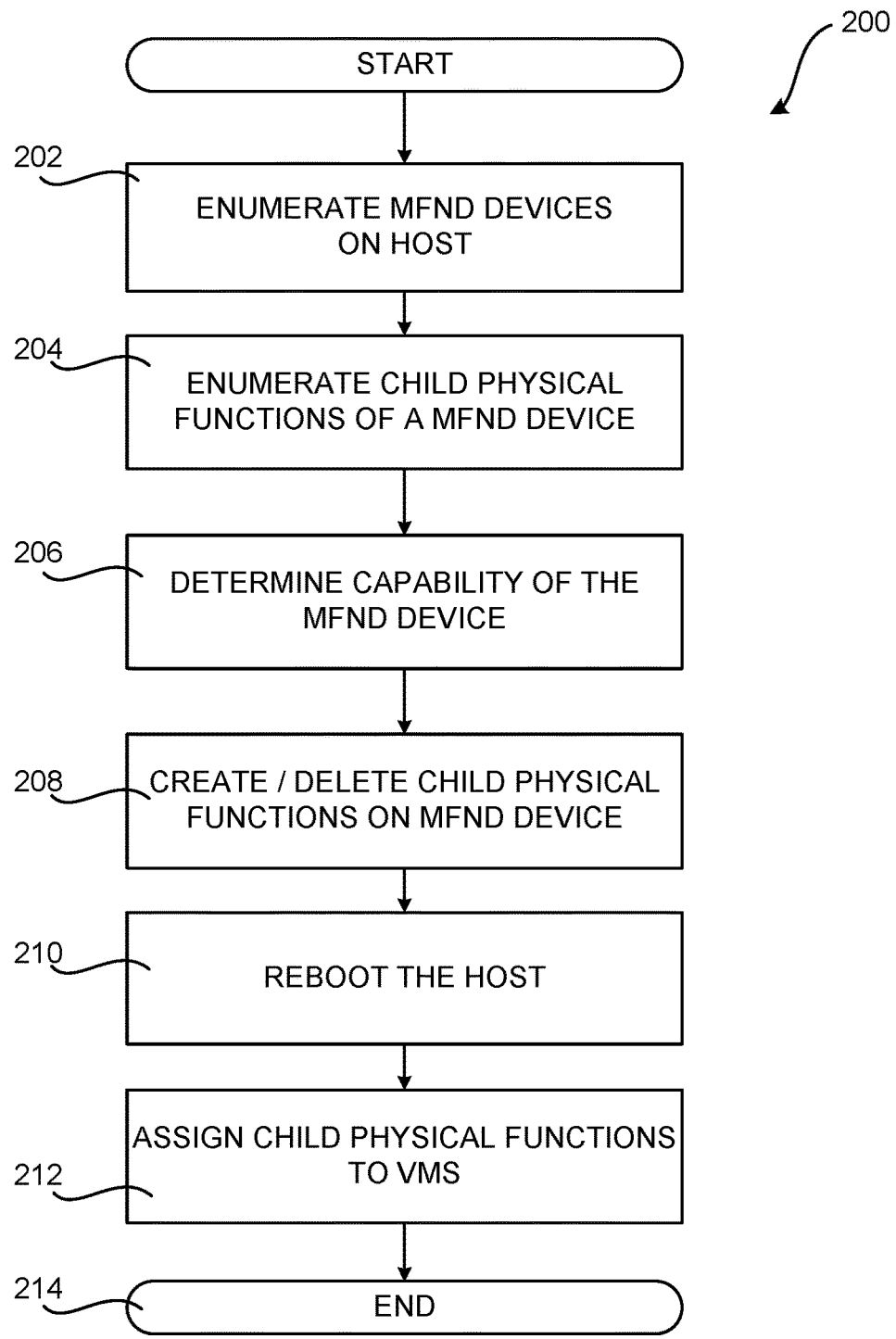
FIG. 2 is a flow diagram showing a routine 200 that illustrates aspects of a method for managing the child physical functions of a MFDN, according to one embodiment disclosed herein.

FIG. 2 is a flow diagram showing a routine 200 that illustrates aspects of a method for managing the child PFs 112B-112N of a MFND 102, according to one embodiment disclosed herein. It should be appreciated that the logical operations described herein with regard to FIG. 2, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 200 begins at operation 202, where the host agent 116 can enumerate some or all of the MFND devices 102 that are present in a host 100. One particular method (which might be referred to herein as the "GetMFNDList" method) for enumerating the MFND devices 102 connected to a host 100 returns device paths of all MFND devices 102 connected to a host 100. If no MFND devices 102 are connected, or none are enumerated, the GetMFNDList method returns an error code.

From operation 202, the routine 200 proceeds to operation 204, where the host agent 116 can enumerate the child PFs 112B-112N that are currently present on a MFND device 102 identified at operation 202. One method (which might be referred to herein as the "GetChildPhysicalFunctionList" method) for enumerating the child PFS 112A-112N on a MFND device 102 takes an identifier (e.g. a handle) for a particular MFND device 102 as input and returns adapter serial numbers of all child PFs 112B-112N on the identified device.

From operation 204, the routine 200 proceeds to operation 206, where the host agent 116 can determine the capabilities of the MFND device 102 identified at operation 202. For example, the host agent 116 can determine the maximum number of child PFs 112B-112N supported by the MFND device 102.

One method (which might be referred to herein as the "GetDeviceCapability" method) for getting the capabilities of a MFND device 102 takes an identifier (e.g. a handle) for a particular MFND device 102 as input and returns a device capability structure that specifies the capabilities of the identified device. In one embodiment, the device capability structure includes data identifying the maximum and available child PFs 112B-112N, I/O queue pair count, interrupt count, namespace count, storage size, bandwidth, and IOPS of the identified device. The device capability structure might include additional or alternate data in other embodiments.

Once the capabilities of the MFND device 102 have been determined, the routine 200 can proceed from operation 206 to operation 208, where child PFs 112B-112N can be created or deleted on the MFND device 102. By default, the MFND 102 has only one PF, the parent PF 112A, which is reserved for receiving administrative commands 110 from the root partition 108.

In order to assign individual child PFs 112B-112N to VMs 104A-104N in the manner described below, the child PFs 112B-112N are first created. The newly created child PFs 112B-112N will appear to the host 100 following a reboot. One method for creating child PFs 112B-112N (which might be referred to herein as the "CreateChildPhysicalFunction" method) takes an identifier (e.g. a handle) to a MFND 102 and a pointer to a data structure containing the settings for the new child PF 112 as input. The data structure can include data specifying the resources (e.g. the amount of storage space, namespaces, and interrupt vectors that the new PF 112 can use) and QoS that are to be assigned to the new child PF 112. The CreateChildPhysicalFunction method returns an identifier (e.g. a serial number) for the new child PF 112 as output if it completes successfully.

Child PFs 112B-112N and their settings will persist across reboots of the host 100, so the maximum number of child PFs 112B-112N to be supported may be initially created to avoid rebooting the host 100 in the future. If a MFND 102 already has child PFs 112B-112N, either as a result of a manufacturing configuration or previous user configuration, additional child PFs 112B-112N can be created or deleted in order to configure the MFND 102 with the maximum number of child PFs 112B-112N to be supported.

One method for deleting child PFs 112B-112N (which might be referred to herein as the "DeleteChildPhysicalFunction" method) takes an identifier for a MFND 102 (e.g. a handle) and the serial number for the child PF 112 to be deleted as input. The DeleteChildPhysicalFunction returns a success message if the identified child PF 112 was successfully deleted and otherwise returns an error code.

Once the host 100 has rebooted, the routine 200 proceeds from operation 210 to operation 212, where the child PFs 112B-112N provided by a MFND 102 can be assigned to VMs 108A-108N. As described briefly above, newly created child PFs 112B-112N have zero storage size, minimal flexible resources, and no QoS. Accordingly, the host 100 needs to provision the resources (NVM space, I/O queue pair count, etc.) to a child PF 112B-112N before it can be assigned to a VM 104 using DDA, HYPER-V NVMe Direct, or another direct storage assignment technology.

The child PFs 112B-112N can also be securely erased before assignment to a VM 104. There is no host reboot involved in this workflow. One method for securely erasing child PFs 112B-112N (which might be referred to herein as the "SecureEraseChildPhysicalFunction" method) takes an identifier for a MFND 102 (e.g. a handle) and the serial number for the child PF 112 to be erased as input. The SecureEraseChildPhysicalFunction returns a success message if the identified child PF 112 was successfully erased and otherwise returns an error code. From operation 212, the routine 200 proceeds to operation 214, where it ends.

Figure 3:
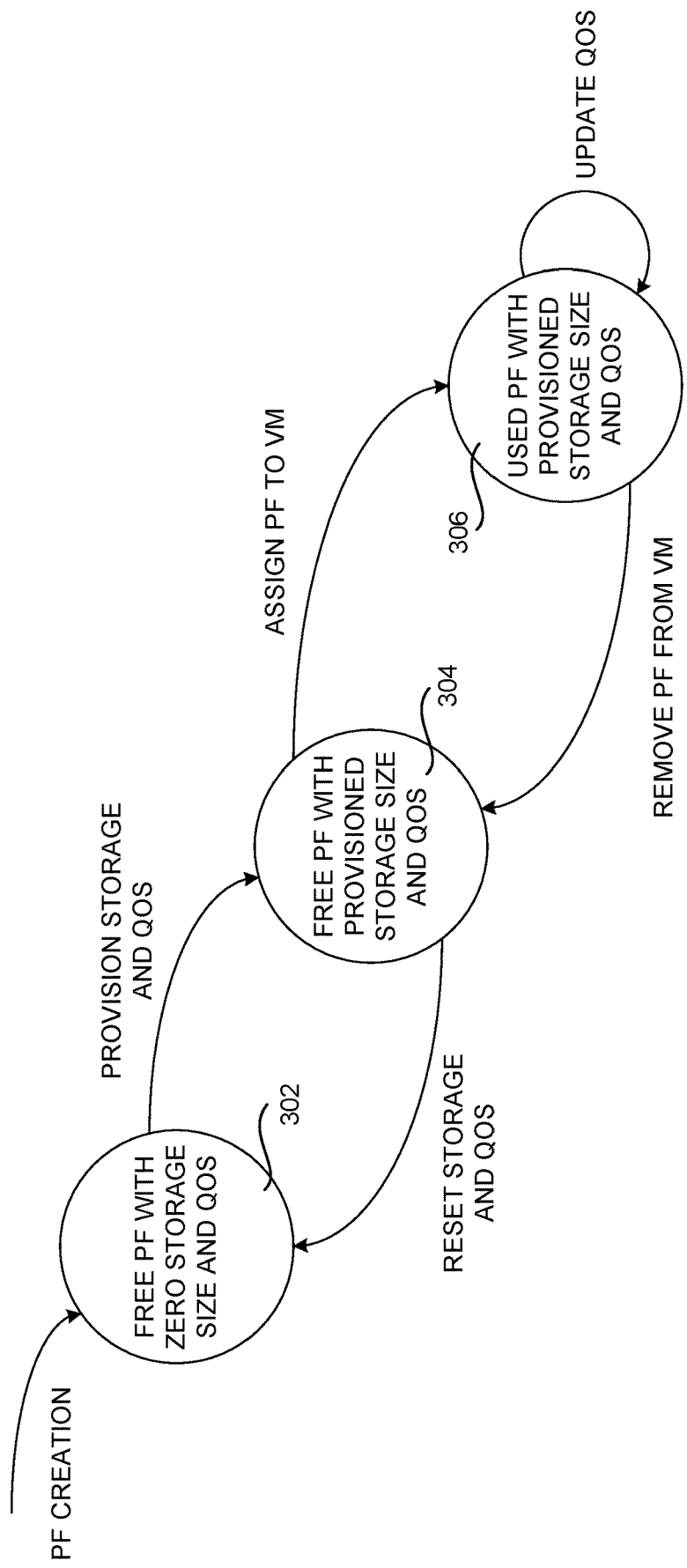
FIG. 3 is a state diagram illustrating additional aspects of the process described with reference for FIG. 2 for managing the child physical functions of a MFDN, according to one embodiment disclosed herein.

FIG. 3 is a state diagram illustrating additional aspects of the process described above with reference for FIG. 2 for managing the child physical functions 112B-112N of a MFDN 102, according to one embodiment disclosed herein. As shown in FIG. 3 and described briefly above, when a new child PF 112B-112N is created, the new child PF 112B-112N has zero storage and QoS (state 302). Therefore, before assigning the new child PF 112B-112N to a VM 104, the new child PF 112B-112N must have its storage size and QoS provisioned (state 304) in the manner described above.

Once the size and QoS of the new child PF 112B-112N have been provisioned, the new child PF 112B-112N can be assigned to a VM 104 (state 306). While the new child PF 112B-112N is used by a VM 104, the QoS of the new child PF 112B-112N can be changed. Details regarding this process are provided below.

When the host agent 116 deletes a VM 104 (i.e. state 306→state 304), it should also secure erase all the child PFs 112B-112N assigned to that VM 104, deallocate resources from the PFs 112B-112N, and set them as free (state 304) so that the child PFs 112B-112N can be assigned to other VMs 104. There is no host reboot involved in this workflow.

As discussed briefly above, once a child physical function has been created, a host computing device 100 can retrieve data describing the state of the child physical function through a parent physical function. The state data can include data describing the health of the child physical function and the resources assigned to it, runtime states that provide info on performance, and other types of information. Additionally, and as also described briefly above, a parent physical function can receive notification of events from a child physical function. This capability allows the host to know if a child physical function stops working or has encountered issues that prevent it from working. A parent physical function can also execute operations against a child physical function such as, for example, the operation for securely erasing a child physical function described above.

Managing Settings Associated with Child Physical Functions of a MFND

As discussed briefly above, the disclosed technologies also include functionality for managing the settings associated with individual child PFs 112 of MFNDs 102. For example, and without limitation, implementations of the disclosed technologies can enable a host agent 116 to query and modify the settings associated with individual child PFs 112B-112N of an MFND 102.

One method for querying the settings of child PFs 112B-112N (which might be referred to herein as the "QueryChildPhysicalFunctionSettings" method) takes an identifier (e.g. a handle) for a MFND 102 and an identifier (e.g. a serial number) of a child PF 112 as input. The QueryChildPhysicalFunctionSettings method returns a pointer to a data structure containing the current settings of the identified child PF 112. As discussed above, such a data structure can include data specifying the resources (e.g. the amount of storage space, namespaces, and interrupt vectors that the PF 112 can use) and QoS that are currently assigned to the identified child PF 112.

One method for modifying the settings of child PFs 112B-112N (which might be referred to herein as the "UpdateChildPhysicalFunctionSettings" method) takes an identifier (e.g. a handle) to a MFND 102, an identifier (e.g. a serial number) of a child PF 112, and a pointer to a data structure containing the settings for the child PF 112 as input. As in the examples above, the data structure can include data specifying the resources (e.g. the amount of storage space, namespaces, and interrupt vectors that the identified PF 112 is to use) and QoS that are to be assigned to the identified child PF 112. The UpdateChildPhysicalFunctionSettings method returns a success message if the supplied settings were successfully applied to the identified child PF 112 and otherwise returns an error code.

The disclosed technologies also enable a parent PF 112A to enable/disable the commands child PFs 112B-112N can issue. For instance, the parent PF 112A might configure the child PFs 112B-112N such that they cannot issue commands for updating the firmware of the MFND 102 or execute vendor-specific commands.

The disclosed technologies also include methods for pausing child PFs 112B-112N (which might be referred to herein as the "PauseChildPhysicalFunction" method), resuming child PFs 112B-112N (which might be referred to herein as the "ResumeChildPhysicalFunction" method), saving the state of child PFs 112B-112N (which might be referred to herein as the "SaveChildPhysicalFunctionStates" method), and restoring the state of child PFs 112B-112N (which might be referred to herein as the "RestoreChildPhysicalFunctionState" method). These methods can be used during a workflow for updating a firmware of the MFND 102.

When the PauseChildPhysicalFunction method is called, the corresponding called child PF 112 executes all of the I/O requests that have already been retrieved from I/O submission queues, puts the results of the I/O requests to I/O completion queues, and pauses itself. When paused, a child PF 112 will not retrieve further I/O requests from I/O submission queues until it is unpaused using the ResumeChildPhysicalFunction method.

The SaveChildPhysicalFunctionStates method saves the state of a child PF 112 in device storage and the RestoreChildPhysicalFunctionState will restore the previously-stored state. As mentioned above, the PauseChildPhysicalFunction method, SaveChildPhysicalFunctionStates method, RestoreChildPhysicalFunctionState method, and ResumeChildPhysicalFunction method are typically used only when an update to the firmware of the MFND 102 is performed.

Managing QoS Provided by Child Physical Functions of a MFND

As also discussed briefly above, the disclosed technologies also include functionality for managing the QoS provided by individual PFs 112 of a MFND 102. For example, and without limitation, implementations of the disclosed technologies can also enable a host agent 116 to query and modify the QoS provided by individual child PFs 112B-112N of an MFND 102.

In some embodiments, the MFND 102 supports multiple storage service level agreements ("SLAs"). Each SLA defines a different QoS level to be provided by a PF 112A-112N. QoS levels that can be supported by child PFs 112 on the MFND 102 include, but are not limited to, a "reserve mode" wherein a child PF 112 receives at least a specified minimum amount of bandwidth and IOPS, a "limit mode" wherein a child PF 112 receives at most a specified maximum amount of bandwidth and IOPS, and a "mixed mode" wherein a child PF 112 receives at least a specified minimum amount of bandwidth and IOPS but at most a specified maximum amount of bandwidth and IOPS. Other QoS levels can be implemented in other embodiments.

The embodiments disclosed herein allow the parent PF 112A to individually define the QoS for each child PF 112B-112N in a single MFND 102. For instance, the parent PF 112A might define the minimum and/or maximum bandwidth and/or IOPS to be supported by each child PF 112B-112N. The UpdateChildPhysicalFunctionSettings described above can be utilized to set or modify the QoS of child PFs 112B-112N.

Some asynchronous events, such as media performance degradation, may cause the host agent 116 to change the QoS of a child PF 112B-112N. In this scenario, the host agent 116 can identify the child PF 112B-112N whose QoS needs to be updated and call the management API 118 to change the QoS for that function. There is no host reboot involved in this workflow.

Figure 4:
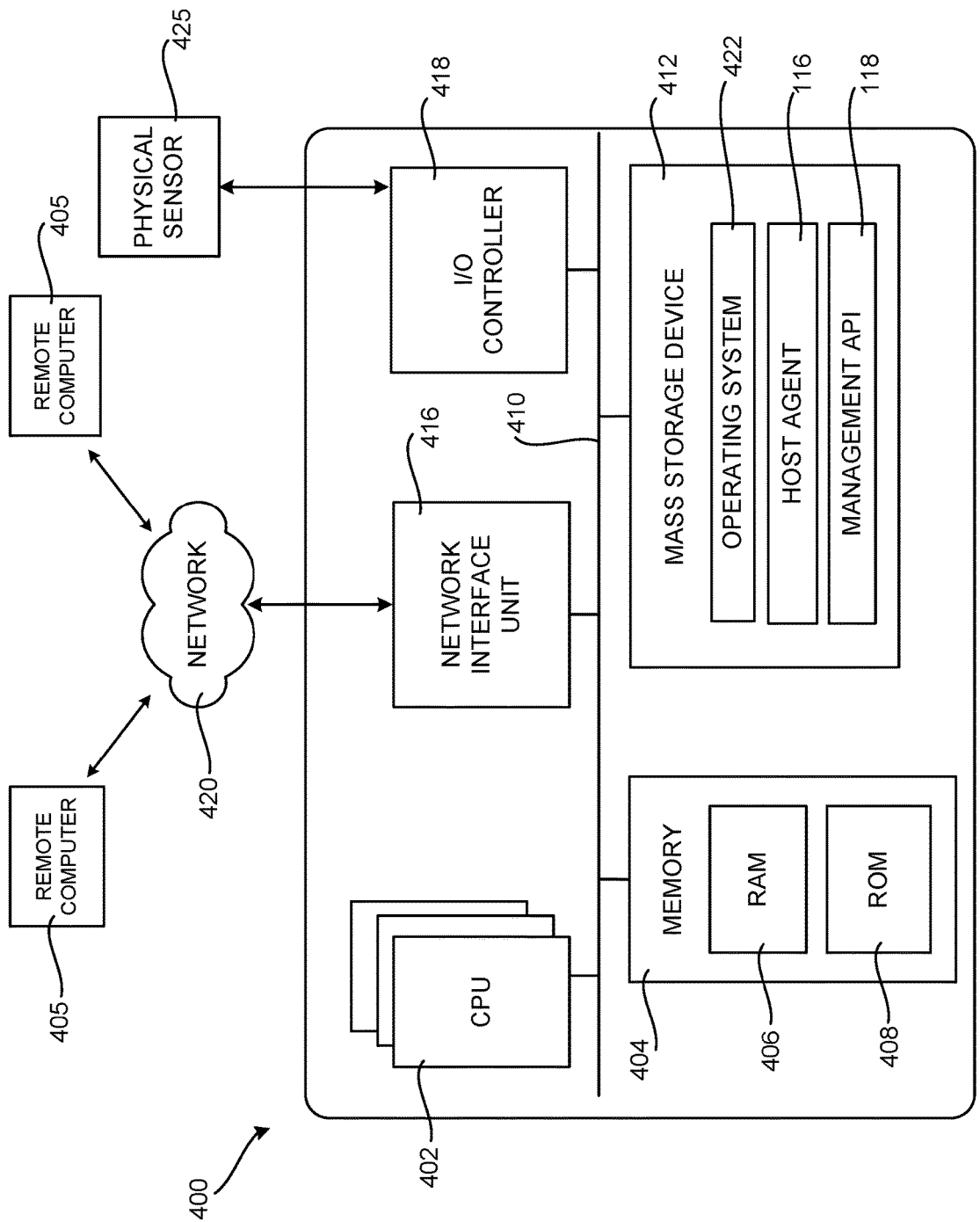
FIG. 4 is a computer architecture diagram showing an illustrative computer hardware and software architecture for a computing device that can act as a host for a MFDN that implements aspects of the technologies presented herein.

FIG. 4 is a computer architecture diagram showing an illustrative computer hardware and software architecture for a computing device that can act as a host 100 for a MFDN 102 that implements aspects of the technologies presented herein. In particular, the architecture illustrated in FIG. 4 can be utilized to implement a server computer, mobile phone, an e-reader, a smartphone, a desktop computer, an AR/VR device, a tablet computer, a laptop computer, or another type of computing device that acts as a host 100 for the MFDN 102.

The data processing system 400 illustrated in FIG. 4 includes a central processing unit 402 ("CPU"), a system memory 404, including a random-access memory 406 ("RAM") and a read-only memory ("ROM") 408, and a system bus 410 that couples the memory 404 to the CPU 402. A basic input/output system ("BIOS" or "firmware") containing the basic routines that help to transfer information between elements within the data processing system 400, such as during startup, can be stored in the ROM 408. The data processing system 400 further includes a mass storage device 412 for storing an operating system 422, application programs, and other types of programs. For example, the mass storage device 412 might store the host agent 116 and the management API 118. The mass storage device 412 can also be configured to store other types of programs and data.

The mass storage device 412 is connected to the CPU 402 through a mass storage controller (not shown) connected to the bus 410. The mass storage device 412 and its associated computer readable media provide non-volatile storage for the data processing system 400. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the data processing system 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the data processing system 400. For purposes of the claims, the phrase "computer storage medium," and variations thereof, does not include waves or signals per se or communication media.

According to various configurations, the data processing system 400 can operate in a networked environment using logical connections to remote computers through a network such as the network 420. The data processing system 400 can connect to the network 420 through a network interface unit 416 connected to the bus 410. It should be appreciated that the network interface unit 416 can also be utilized to connect to other types of networks and remote computer systems. The data processing system 400 can also include an input/output controller 418 for receiving and processing input from a number of other devices, including a keyboard, mouse, touch input, an electronic stylus (not shown in FIG. 4), or a physical sensor such as a video camera. Similarly, the input/output controller 418 can provide output to a display screen or other type of output device (also not shown in FIG. 4).

It should be appreciated that the software components described herein, when loaded into the CPU 402 and executed, can transform the CPU 402 and the overall data processing system 400 from a general-purpose computing device into a special-purpose computing device customized to facilitate the functionality presented herein. The CPU 402 can be constructed from any number of transistors or other discrete circuit elements, which can individually or collectively assume any number of states. More specifically, the CPU 402 can operate as a finite-state machine, in response to executable instructions contained within the software modules disclosed herein. These computer-executable instructions can transform the CPU 402 by specifying how the CPU 402 transitions between states, thereby transforming the transistors or other discrete hardware elements constituting the CPU 402.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the data processing system 400 in order to store and execute the software components presented herein. It also should be appreciated that the architecture shown in FIG. 4 for the data processing system 400, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the data processing system 400 might not include all of the components shown in FIG. 4, can include other components that are not explicitly shown in FIG. 4, or can utilize an architecture completely different than that shown in FIG. 4.

Figure 5:
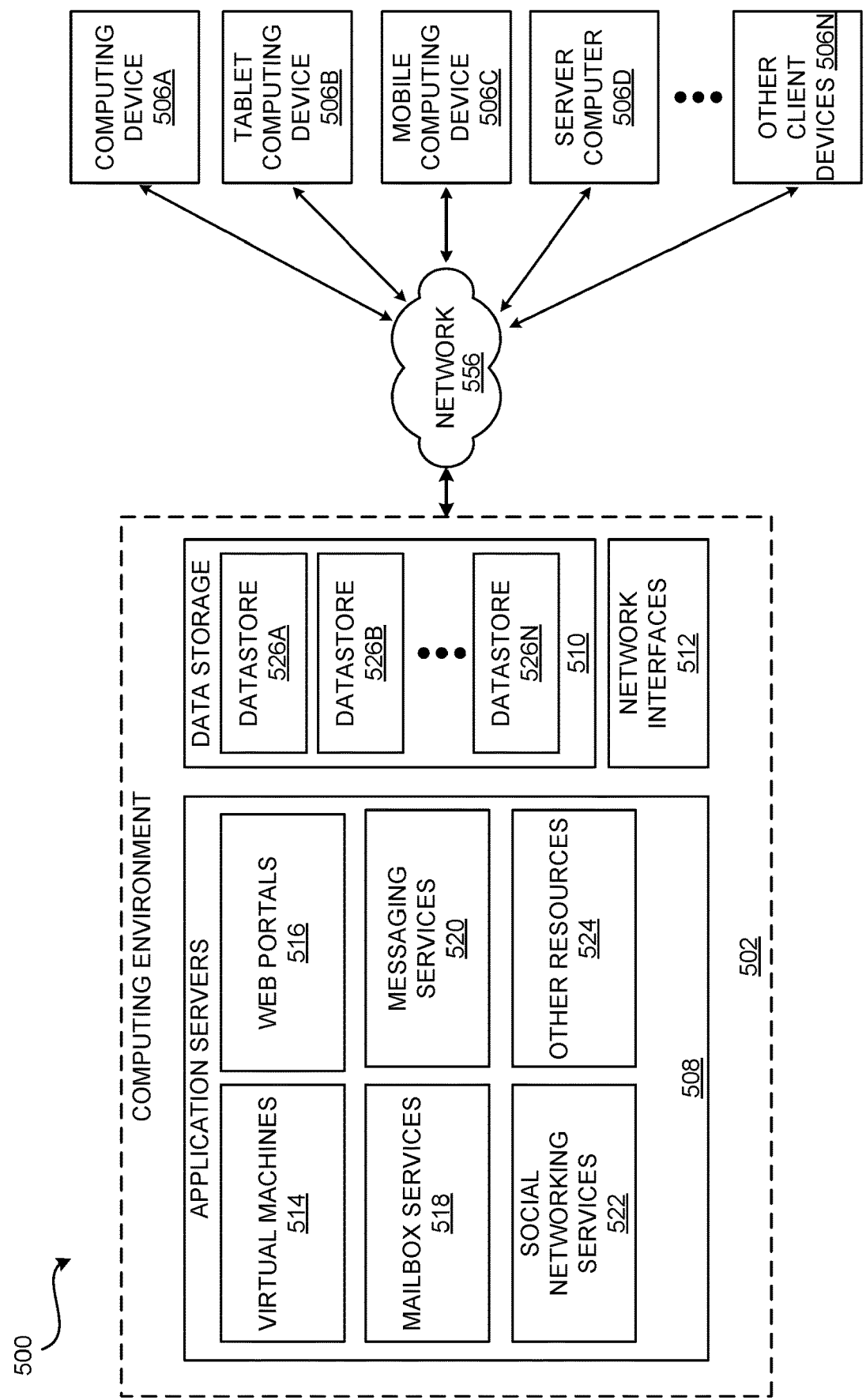
FIG. 5 is a computing network architecture diagram showing an illustrative configuration for a computing environment in which computing devices hosting MFDNs implementing the disclosed technologies can be utilized.

FIG. 5 is a computing network architecture diagram showing an illustrative configuration for a distributed computing environment 500 in which computing devices hosting MFDNs 102 implementing the disclosed technologies can be utilized. According to various implementations, the distributed computing environment 500 includes a computing environment 502 operating on, in communication with a network 556. One or more client devices 506A-506N (hereinafter referred to collectively and/or generically as "clients 506") can communicate with the computing environment 502 via the network 504 and/or other connections (not illustrated in FIG. 5).

In one illustrated configuration, the clients 506 include a computing device 506A such as a laptop computer, a desktop computer, or other computing device; a tablet computing device ("tablet computing device") 506B; a mobile computing device 506C such as a smartphone, an on-board computer, or other mobile computing device; or a server computer 506D. It should be understood that any number of devices 506 can communicate with the computing environment 502. An example computing architecture for the devices 506 is illustrated and described herein with reference to FIG. 5. It should be understood that the illustrated devices 506 and computing architectures illustrated and described herein are illustrative only and should not be construed as being limited in any way.

In the illustrated configuration, the computing environment 502 includes application servers 508, data storage 510, and one or more network interfaces 512. According to various implementations, the functionality of the application servers 508 can be provided by one or more server computers that are executing as part of, or in communication with, the network 504. The application servers 508 can host various services, VMs, portals, and/or other resources. The application servers 508 can also be implemented using host computing devices 100 that includes MFNDs 102 configured in the manner described herein.

In the illustrated configuration, the application servers 508 host one or more virtual machines 514 for hosting applications, network services, or for providing other functionality. It should be understood that this configuration is illustrative only and should not be construed as being limiting in any way. The application servers 508 can also host or provide access to one or more portals, link pages, web sites, network services, and/or other information sites, such as web portals 516.

According to various implementations, the application servers 508 also include one or more mailbox services 518 and one or more messaging services 520. The mailbox services 518 can include electronic mail ("email") services. The mailbox services 518 also can include various personal information management ("PIM") services including, but not limited to, calendar services, contact management services, collaboration services, and/or other services. The messaging services 520 can include, but are not limited to, instant messaging services, chat services, forum services, and/or other communication services.

The application servers 508 also might include one or more social networking services 522. The social networking services 522 can include various social networking services including, but not limited to, services for sharing or posting status updates, instant messages, links, photos, videos, and/or other information; services for commenting or displaying interest in articles, products, blogs, or other resources; and/or other services. Other services are possible and are contemplated.

The social networking services 522 also can include commenting, blogging, and/or micro blogging services. Other services are possible and are contemplated. As shown in FIG. 5, the application servers 508 also can host other network services, applications, portals, and/or other resources ("other resources") 524. The other resources 524 can include, but are not limited to, document sharing, rendering, or any other functionality.

As mentioned above, the computing environment 502 can include data storage 510. According to various implementations, the functionality of the data storage 510 is provided by one or more databases operating on, or in communication with, the network 504. The functionality of the data storage 510 also can be provided by one or more server computers configured to host data for the computing environment 502. The data storage 510 can include, host, or provide one or more real or virtual data stores 526A-526N (hereinafter referred to collectively and/or generically as "datastores 526").

The datastores 526 are configured to host data used or created by the application servers 508 and/or other data. Although not illustrated in FIG. 5, the datastores 526 also can host or store web page documents, word processing documents, presentation documents, data structures, and/or other data utilized by any application program or another module. Aspects of the datastores 526 might be associated with a service for storing files.

The computing environment 502 can communicate with, or be accessed by, the network interfaces 512. The network interfaces 512 can include various types of network hardware and software for supporting communications between two or more computing devices including, but not limited to, the clients 506 and the application servers 508. It should be appreciated that the network interfaces 512 also might be utilized to connect to other types of networks and/or computer systems.

It should be understood that the distributed computing environment 500 described herein can implement aspects of at least some of the software elements described herein with any number of virtual computing resources and/or other distributed computing functionality that can be configured to execute any aspects of the software components disclosed herein.

It should be further understood that the disclosure presented herein also encompasses the subject matter set forth in the following clauses:

Clause 1. A computer-implemented method, comprising: receiving a request at a parent physical function of a multiple physical function non-volatile memory device (MFND) to create a child physical function on the MFND; and responsive to the request, creating the child physical function on the MFND and returning an identifier for the child physical function in response to the request.

Clause 2. The computer-implemented method of clause 1, wherein the request further specifies resources to be provided by the child physical function, and wherein the method further comprises configuring the child physical function to provide the specified resources responsive to the request.

Clause 3. The computer-implemented method of any of clauses 1 or 2, wherein the request further specifies a Quality of Service (QoS) level for the child physical function, and wherein the method further comprises configuring the child physical function to provide the specified QoS level responsive to the request.

Clause 4. The computer-implemented method of any of clauses 1-3, wherein the parent physical function of the MFND is further configured to receive a request to delete the child physical function and to delete the child physical function in response to the request.

Clause 5. The computer-implemented method of any of clauses 1-4, wherein the parent physical function of the MFND is further configured to receive a request to enumerate child physical functions currently on the MFND and to return data identifying the child physical functions currently on the MFND in response to the request.

Clause 6. The computer-implemented method of any of clauses 1-5, wherein the parent physical function of the MFND is further configured to receive a request for settings of the child physical function and to return data identifying the settings of the child physical function in response to the request.

Clause 7. The computer-implemented method of any of clauses 1-6, wherein the parent physical function of the MFND is further configured to receive a request to modify settings of the child physical function and to modify the settings of the child physical function in response to the request.

Clause 8. A multiple physical function non-volatile memory device (MFND), comprising: a parent physical function configured to receive a request from a host computing device to create a child physical function on the MFND and to create the child physical function on the MFND in response to the request; and the child physical function.

Clause 9. The MFND of clause 8, wherein the request specifies resources to be provided by the child physical function, and wherein the parent physical function is further operative to configure the child physical function to provide the specified resources.

Clause 10. The MFND of any of clauses 8 or 9, wherein the request further specifies a Quality of Service (QoS) level for the child physical function, and wherein the parent physical function is further operative to configure the child physical function to provide the specified QoS level.

Clause 11. The MFND of any of clauses 8-10, wherein the parent physical function is further configured to receive a request to delete the child physical function and to delete the child physical function in response to the request.

Clause 12. The MFND of any of clauses 8-11, wherein the parent physical function is further configured to retrieve state data from the child physical function.

Clause 13. The MFND of any of clauses 8-12, wherein the parent physical function is further configured to receive notifications of events from the child physical function.

Clause 14. The MFND of any of clauses 8-13, wherein the parent physical function is further configured to execute an operation against the child physical function.

Clause 15. A non-transitory computer-readable storage medium having computer-executable instructions stored thereupon which, when executed by one or more processors, cause the one or more processors to: receive a request at a parent physical function of a multiple physical function non-volatile memory device (MFND) to create a child physical function on the MFND; and responsive to the request, create the child physical function on the MFND and return an identifier for the child physical function in response to the request.

Clause 16. The non-transitory computer-readable storage medium of clause 15, wherein the request further specifies resources to be provided by the child physical function, and wherein the non-transitory computer-readable storage has further instructions stored thereupon to configure the child physical function to provide the specified resources responsive to the request.

Clause 17. The non-transitory computer-readable storage medium of any of clauses 15 or 16, wherein the request further specifies a Quality of Service (QoS) level for the child physical function, and wherein the non-transitory computer-readable storage has further instructions stored thereupon to configure the child physical function to provide the specified QoS level responsive to the request.

Clause 18. The non-transitory computer-readable storage medium of any of clauses 15-17, wherein the parent physical function of the MFND is further configured to receive a request to delete the child physical function and to delete the child physical function in response to the request.

Clause 19. The non-transitory computer-readable storage medium of any of clauses 15-18, wherein the parent physical function of the MFND is further configured to receive a request to enumerate child physical functions currently on the MFND and to return data identifying the child physical functions currently on the MFND in response to the request.

Clause 20. The non-transitory computer-readable storage medium of any of clauses 15-19, wherein the parent physical function of the MFND is further configured to receive a request for settings of the child physical function and to return data identifying the settings of the child physical function in response to the request.

Although the technologies presented herein have been described in language specific to structural features and/or methodological acts, it is to be understood that the appended claims are not necessarily limited to the features or acts described. Rather, the features and acts are described as example implementations of such technologies. Moreover, the above-described subject matter may be implemented as a computer-controlled apparatus, a computer process, a computing system, or as an article of manufacture such as a computer-readable storage medium.

The operations of the example methods presented herein are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more instances of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computer-implemented method, comprising:
   receiving a request at a parent physical function of a multiple physical function non-volatile memory device (MFND) to create a child physical function on the MFND; and
   responsive to the request, creating the child physical function on the MFND and returning an identifier for the child physical function in response to the request.

2. The computer-implemented method of claim 1, wherein the request further specifies resources to be provided by the child physical function, and wherein the method further comprises configuring the child physical function to provide the specified resources responsive to the request.

3. The computer-implemented method of claim 1, wherein the request further specifies a Quality of Service (QoS) level for the child physical function, and wherein the method further comprises configuring the child physical function to provide the specified QoS level responsive to the request.

4. The computer-implemented method of claim 1, wherein the parent physical function of the MFND is further configured to receive a request to delete the child physical function and to delete the child physical function in response to the request.

5. The computer-implemented method of claim 1, wherein the parent physical function of the MFND is further configured to receive a request to enumerate child physical functions currently on the MFND and to return data identifying the child physical functions currently on the MFND in response to the request.

6. The computer-implemented method of claim 1, wherein the parent physical function of the MFND is further configured to receive a request for settings of the child physical function and to return data identifying the settings of the child physical function in response to the request.

7. The computer-implemented method of claim 1, wherein the parent physical function of the MFND is further configured to receive a request to modify settings of the child physical function and to modify the settings of the child physical function in response to the request.

8. A multiple physical function non-volatile memory device (MFND), comprising:
   a parent physical function configured to receive a request from a host computing device to create a child physical function on the MFND and to create the child physical function on the MFND in response to the request; and
   the child physical function.

9. The MFND of claim 8, wherein the request specifies resources to be provided by the child physical function, and wherein the parent physical function is further operative to configure the child physical function to provide the specified resources.

10. The MFND of claim 8, wherein the request further specifies a Quality of Service (QoS) level for the child physical function, and wherein the parent physical function is further operative to configure the child physical function to provide the specified QoS level.

11. The MFND of claim 8, wherein the parent physical function is further configured to receive a request to delete the child physical function and to delete the child physical function in response to the request.

12. The MFND of claim 8, wherein the parent physical function is further configured to retrieve state data from the child physical function.

13. The MFND of claim 8, wherein the parent physical function is further configured to receive notifications of events from the child physical function.

14. The MFND of claim 8, wherein the parent physical function is further configured to execute an operation against the child physical function.

15. A non-transitory computer-readable storage medium having computer-executable instructions stored thereupon which, when executed by one or more processors, cause the one or more processors to:
   receive a request at a parent physical function of a multiple physical function non-volatile memory device (MFND) to create a child physical function on the MFND; and
   responsive to the request, create the child physical function on the MFND and return an identifier for the child physical function in response to the request.

16. The non-transitory computer-readable storage medium of claim 15, wherein the request further specifies resources to be provided by the child physical function, and wherein the non-transitory computer-readable storage has further instructions stored thereupon to configure the child physical function to provide the specified resources responsive to the request.

17. The non-transitory computer-readable storage medium of claim 15, wherein the request further specifies a Quality of Service (QoS) level for the child physical function, and wherein the non-transitory computer-readable storage has further instructions stored thereupon to configure the child physical function to provide the specified QoS level responsive to the request.

18. The non-transitory computer-readable storage medium of claim 15, wherein the parent physical function of the MFND is further configured to receive a request to delete the child physical function and to delete the child physical function in response to the request.

19. The non-transitory computer-readable storage medium of claim 15, wherein the parent physical function of the MFND is further configured to receive a request to enumerate child physical functions currently on the MFND and to return data identifying the child physical functions currently on the MFND in response to the request.

20. The non-transitory computer-readable storage medium of claim 15, wherein the parent physical function of the MFND is further configured to receive a request for settings of the child physical function and to return data identifying the settings of the child physical function in response to the request.

\* \* \* \* \*